(12) United States Patent
Liu et al.

(10) Patent No.: US 11,162,357 B2
(45) Date of Patent: Nov. 2, 2021

(54) DETERMINING SAFE DRILLING MUD WEIGHT

(71) Applicant: Saudi Arabian Oil Company, Dhahran (SA)

(72) Inventors: Chao Liu, Houston, TX (US); Younane N. Abousleiman, Norman, OK (US); Yanhui Han, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 230 days.

(21) Appl. No.: 16/428,185

(22) Filed: May 31, 2019

(65) Prior Publication Data

US 2019/0368346 A1    Dec. 5, 2019

Related U.S. Application Data

(60) Provisional application No. 62/678,790, filed on May 31, 2018.

(51) Int. Cl.
| | | |
|---|---|---|
| *E21B 49/00* | (2006.01) | |
| *E21B 47/06* | (2012.01) | |
| *G01V 1/50* | (2006.01) | |
| *E21B 47/007* | (2012.01) | |
| *E21B 47/26* | (2012.01) | |

(52) U.S. Cl.
CPC .......... *E21B 49/005* (2013.01); *E21B 47/007* (2020.05); *E21B 47/06* (2013.01); *E21B 47/26* (2020.05); *G01V 1/50* (2013.01); *G01V 2210/646* (2013.01)

(58) Field of Classification Search
CPC .... G01V 1/50; G01V 2210/646; E21B 21/08; E21B 47/00; E21B 47/007; E21B 47/06; E21B 49/005
See application file for complete search history.

(56) References Cited

U.S. PATENT DOCUMENTS

2015/0055438 A1   2/2015   Rui et al.

FOREIGN PATENT DOCUMENTS

| WO | 00/60379 | 10/2000 |
|---|---|---|
| WO | 2013112114 | 8/2013 |
| WO | 2015163858 | 10/2015 |

OTHER PUBLICATIONS

Gulf Cooperation Council Examination Report in GCC Appln. No. GC 2019-37688, dated Dec. 25, 2020, 4 pages.
International Search Report and Written Opinion issued in International Application No. PCT/US2019/034642 dated Sep. 5, 2019, 12 pages.

(Continued)

*Primary Examiner* — Michael J Dalbo
(74) *Attorney, Agent, or Firm* — Fish & Richardson P.C.

(57) ABSTRACT

A number of average compressibility values of a fractured rock in a wellbore from a depth of interest is determined, where each of the number of average compressibility values is determined according to a different average scheme. For each of the number of average compressibility values, a set of effective stresses' values based on that average compressibility value. For each determined set of stresses values, a set of mud weight window values is determined based on the set of stresses values. A mud weight for the wellbore is adjusted to be within the determined set of mud weight window.

20 Claims, 5 Drawing Sheets

(56) References Cited

OTHER PUBLICATIONS

Abass et al., "Wellbore Instability of Shale Formation, Zuluf Field, Saudi Arabia," presented at the SPE Technical Symposium on Saudi Arabia Section, Dhahran, Saudi Arabia, May 21-23, 2006, 10 pages.

Berryman, "Extension of Poroelastic Analysis to Double-Porosity Materials: New Technique in Microgeomechanics," Journal of Eng Mech., vol. 128, No. 8, 2002, 8 pages.

Bratton et al., "The Nature of Naturally Fractured Reservoirs," June Oilfield Review, 2006, 21 pages.

Caenn et al., "Chapter 9: Wellbore Stability," p. 359, in Composition and Properties of Drilling and Completion Fluids, 7th Edition: Gulf Professional Publishing, 2016, 1 page.

Dagan, "Models of Groundwater Flow in Statistically Homogeneous Porous Formations," Water Resource Res. vol. 15, Feb. 1979, 17 pages.

Li et al., "Differentiating Open Natural Fractures from Healed Fractures Using the New, High-Definition Oil-Based Mud Microelectrical Imager-Case Studies from Organic Rich Shales," presented at the SPE Annual Technical Conference and Exhibition held in Houston, Texas, Sep. 28-30, 2015, 16 pages.

Liu and Abousleiman, "Effects of Mudcake and Formation N-Porosity N-Permeability on Wellbore Stability," SPE Journal, Oct. 2018, 25 pages.

Nguyen and Abousleiman, "Poromechanics Response of Inclined Wellbore Geometry in Chemically Active Fractured Porous Media," Journal of Engineering Mechanics, vol. 135, No. 11, Nov. 2005, 14 pages.

Ottesen, "Wellbore Stability in Fractured Rock," presented at the IADC/SPE Drilling Conference and Exhibition, New Orleans, Louisiana, Feb. 2-4, 2010, 8 pages.

Santarelli et al., "Drilling through Highly Fractured Formations: A Problem, a Model, and a Cure," presented at the 67th Annual Technical Conference and Exhibition of the Society of Petroleum Engineers, Washington D.C., Oct. 4-7, 1992, 10 pages.

Zimmerman and Bodvarsson, "Hydraulic Conductivity of Rock Fractures," transport in Porous Media, vol. 23, Jan. 1996, 31 pages.

EPO Communication pursuant to Article 94(3) in European Appln. No. 19731095.6-1002, dated May 28, 2021, 4 pages.

LOWER BOUND

FIG. 1A

UPPER BOUND

DETERMINING SAFE DRILLING MUD WEIGHT

TECHNICAL FIELD

The present disclosure relates to determining wellbore stability and, in particular, determining a safe drilling mud weight.

BACKGROUND

Determining the mud weight is important to many practical applications related to wellbore stability analysis for safe drilling practice. Certain geo-mechanical and petrophysical properties of naturally fractured rocks may inform a geologist, engineer, or driller about the safe drilling mud weight window for a particular wellbore. Natural fractures' properties, such as their dimension, distribution, and density, play essential roles in altering the bulk rocks' strength and mechanical properties and are crucial factors for the determination of safe drilling mud weight.

SUMMARY

Implementations of the present disclosure are generally directed to determining a safe drilling mud weight of a wellbore based on a dual-porosity dual-permeability poroelastic model. In this model, a naturally fractured rock is simulated as an overlapping of two porous media each of which has its own properties. Geomechanical properties, such as compressibility, as well as the distribution and the size of the naturally fractured rock are taken into account when using the model to make such determinations.

In some implementations, a number of average compressibility values of a fractured rock in a wellbore from a depth of interest is determined, where each of the number of average compressibility values is determined according to a different average scheme. For each of the number average compressibility values, a set of effective stresses' values based on that average compressibility value are determined. For each determined set of stresses values, a set of mud weight window values are determined based on the set of stresses values. A mud weight for the wellbore is adjusted to be within the determined set of mud weight window.

Implementations of the described subject matter, including the previously described implementation, can be implemented using a computer-implemented method; a non-transitory, computer-readable medium storing computer-readable instructions to perform the computer-implemented method; and a computer-implemented system including one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

Figure 3A:
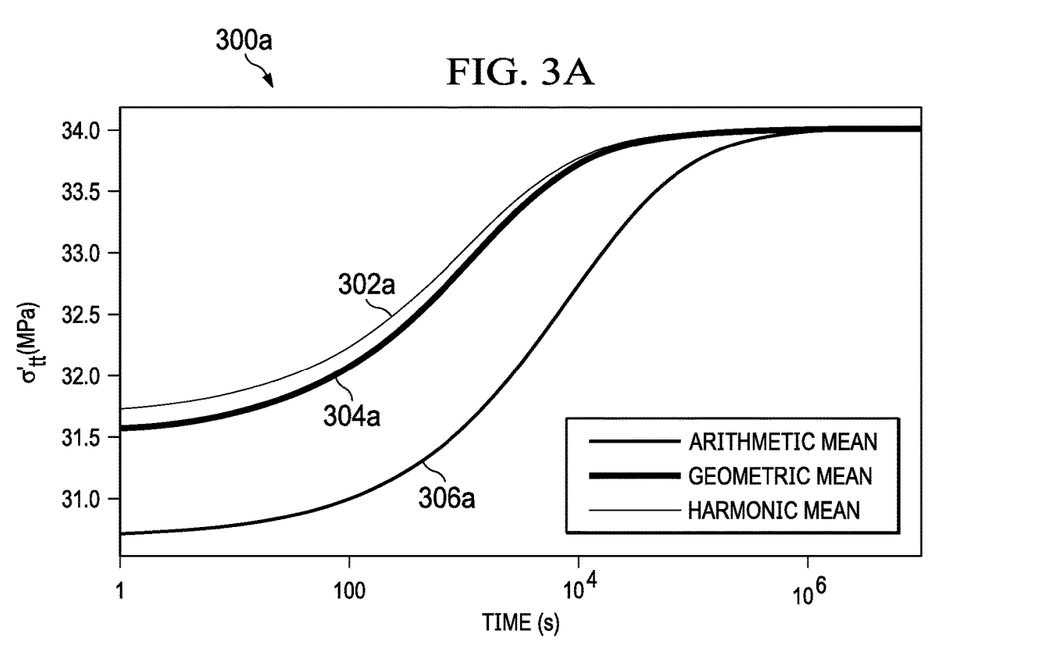
FIG. 3A represents an example set of charts illustrating the effective tangential stress values on the wellbore wall calculated in the direction of the minimal principal in-plane stress ($S_{min}$) and the maximum principal in-plane stress ($S_{max}$), according to some implementations of the present disclosure.
Figure 3B:
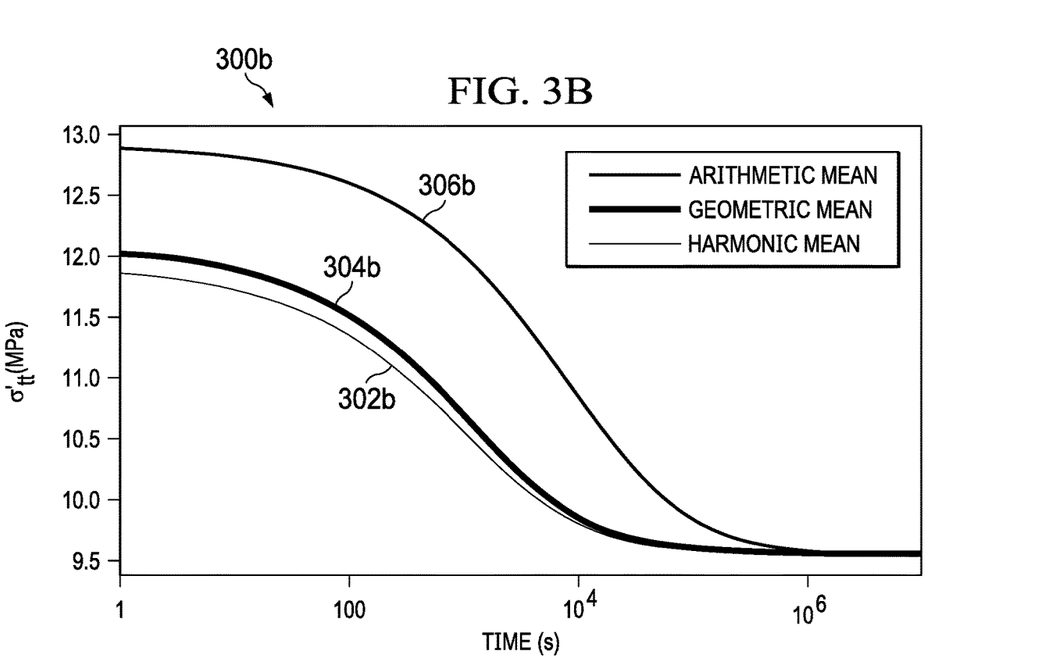
FIG. 3B represents another example set of charts illustrating the effective tangential stress values on the wellbore wall calculated in the direction of the minimal principal in-plane stress ($S_{min}$) and the maximum principal in-plane stress ($S_{max}$), according to some implementations of the present disclosure.

The subject matter described in this specification can be implemented to realize one or more of the following advantages. For example, the bulk compressibility of fractured rocks can be calculated from logs with the fractures' geometry. Further, the range of the safe drilling mud weight window can also be calculated based on fractures' geometry, as shown in FIGS. 3A-3B. Moreover, the proposed model quantifies the effects of natural fractures on wellbore instability, enhancing the understanding of wellbore stability in naturally fractured formations and helping to design safe mud weight to improve the wellbore stability.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DETAILED DESCRIPTION

The present disclosure describes developing a dual-porosity dual-permeability poroelastic model to determine a safe drilling mud weight window of a wellbore, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Wellbore instability problems in naturally fractured shale formations have been widely recorded in the oil and gas drilling practice. Such problems include fluid loss circulation, wellbore collapse, wellbore enlargement, tight holes, and washouts. The cost of drilling non-productive time associated with these wellbore instability problems is estimated to be around several billions of dollars per year. Field drilling operations have shown that drilling mud weight is a crucial factor controlling wellbore stability in naturally fractured formations. The dual-porosity dual-permeability poroelastic model has been used to theoretically show that natural fractures are detrimental to wellbore stability and that the safe drilling mud weight window for naturally fractured rock formation is narrower than that of intact rock with the same rock type. In addition, wellbore image logs have shown various size and distribution of natural fractures in the subsurface formations. Such fractures' geometrical features, together with rock matrix, control the average properties of naturally fractured rocks, such as permeability and compressibility. Formation's compressibility is an essential factor controlling fluid diffusivity, formation's deformation, and the stress fields around the wellbore. As a result, wellbore stability is influenced by the formation's compressibility as well. While the properties of naturally fractured rocks can influence the safe drilling mud weight, the geometrical features of naturally fractured rocks can also control the safe mud drilling weight.

In the present disclosure, a geomechanics simulator is developed to quantitatively show the effects of the fractures' geometry on the time-dependent safe mud weight. In this simulator, a naturally fractured rock is simulated as consisting of two separate and overlapping porous media: one represents the primary porosity (matrix) and the other represents the secondary porosity medium (fracture). Each medium is assigned poromechanical and petrophysical properties. The dual-porosity dual-permeability poroelastic model for an inclined wellbore drilled through a naturally fractured rock formation and subjected to three-dimensional state of stress has been implemented in a stability analyzer. The average properties of the naturally fractured rock are determined based on at least one of the fractures' size, density, or distribution. Three average schemes have been implemented, that is, harmonic mean, geometric mean, and arithmetic mean. Accordingly, the dual-porosity dual-permeability poroelastic model updates the wellbore stresses, pore pressure, mud weight window, and failure regions. The selection of the appropriate average scheme depends on the fractures' geometrical characteristics that can be obtained by image logs. The modeling result shows that the time-dependent stresses, pore pressure, and safe drilling mud weight window vary significantly with the average schemes The governing equations for this proposed dual-porosity dual-permeability poroelastic model are listed as follows.

The constitutive equations for a homogeneous and isotropic dual-poroelastic porous medium or naturally fractured rock formation can be written as the following:

$$\sigma_{ij} = \frac{3p^I}{\overline{C}(1+\overline{v})}\varepsilon\delta_{ij} + \frac{3(1-2\overline{v})}{\overline{C}(1+\overline{v})}\varepsilon_{ij} + (\alpha^{-I}p^I + \alpha^{-II}p^{II})\delta_{ij}. \quad (1)$$

$$\zeta^I = -\alpha^{-I}\varepsilon + \frac{p^I}{\overline{M}^I} + \frac{p^{II}}{\overline{M}^{I,II}}. \quad (2)$$

$$\zeta^{II} = -\alpha^{-II}\varepsilon + \frac{p^I}{\overline{M}^{I,II}} + \frac{p^{II}}{\overline{M}^{II}}. \quad (3)$$

In Equations (1)-(3), the superscripts I and II refer to the porous rock matrix and the porous fracture medium, respectively, $\sigma_{ij}$ and $\varepsilon_{ij}$ are the components of the stress and strain tensors, respectively, $\overline{C}$ and $\overline{v}$ are the average compressibility and Poisson's ratio, respectively, $\delta_{ij}$ is the Kronecker Delta, $\alpha^{-I}$ and $\alpha^{-II}$ are the effective pore pressure coefficients, $p^I$ and $p^{II}$ are the matrix and fracture pore pressure, respectively, $\varepsilon$ is the volumetric strain, $\zeta^I$ and $\zeta^{II}$ are the variation of total fluid contents, $\overline{M}^I$, $\overline{M}^{II}$, and $\overline{M}^{I,II}$ are the effective coupled Biot moduli.

The dual-permeability nature of fractured formations requires dual Darcy's law for the fluid flow, both in the matrix medium and fracture medium. Assuming that the flow in each porous medium obeys Darcy's law, the separate Darcy's flow equations are expressed as follows:

$$q_i^I = -\frac{k^I}{\mu}\frac{\partial p^I}{\partial x_i}. \quad (4)$$

$$q_i^{II} = -\frac{k^{II}}{\mu}\frac{\partial p^{II}}{\partial x_i}. \quad (5)$$

In Equations (4) and (5), $q_i^I$ and $q_i^{II}$ are the flow velocities in the direction in matrix and fractures, respectively, $k^I$ and $k^{II}$ are the matrix and fracture permeability, respectively, and $\mu$ is the fluid viscosity.

Neglecting the body forces, the quasistatic equilibrium equation is presented as:

$$\frac{\partial \sigma_{ij}}{\partial x_j} = 0. \quad (6)$$

The mass conservation of each porous medium, accounting for the inter-porosity fluid pressure diffusivity term, can be expressed separately as follows:

$$\frac{\partial \zeta^I}{\partial t} = -v^I\frac{\partial q_i^I}{\partial x_i} - \Gamma. \quad (7)$$

$$\frac{\partial \zeta^{II}}{\partial t} = -v^{II}\frac{\partial q_i^{II}}{\partial x_i} - \Gamma. \quad (8)$$

In Equations (7) and (8), $v^I$ and $v^{II}$ are the bulk volume fractions, $\Gamma = \lambda(pII-pI) =$ is the total fluid volumetric flux, and $\lambda$ is the inter-porosity flow coefficient.

As shown in Equation (1), the average compressibility $\overline{C}$ plays an important role in the stress-strain relations. In the present disclosure, as an example, three average schemes, that is, harmonic mean, geometric mean, and arithmetic mean, are introduced to calculate this average compressibility from the individual compressibility of rock matrix and fractures. Table 1 illustrates differences in the results calculated by these three average schemes. As illustrated by Table 1, among these three results, an increase of the value of the individual compressibility contributes more significantly to the arithmetic mean, and less significantly to the geometric mean and the harmonic mean.

TABLE 1

Illustration of the differences among the three average schemes.

| | Arithmetic Mean | Geometric Mean | Harmonic Mean |
|---|---|---|---|
| $\frac{1}{n}\sum_{i=1}^{n} x_i \geq \sqrt[n]{\prod_{i=1}^{n} x_i} \geq n\left(\sum_{i=1}^{n} \frac{1}{x^i}\right)^{-1}$ | $\frac{1}{n}\sum_{i=1}^{n} x_i$ | $\sqrt[n]{\prod_{i=1}^{n} x_i}$ | $n\left(\sum_{i=1}^{n} \frac{1}{x^i}\right)^{-1}$ |
| 1 cubic centimeter (cm³), 2 cm³, 2.5 cm³, 4 cm³ | 2.37 | 2.11 | 1.76 |
| 1 cm³, 2 cm³, 2.5 cm³, 40 cm³ | 11.37 | 3.76 | 2.07 |

After choosing the appropriate average scheme for the calculation of average compressibility, the effective stress fields around the wellbore can be calculated using the dual-porosity dual-permeability poroelastic model. Three effective stresses ($\sigma'_{rr}$, $\sigma'_{\theta\theta}$, $\sigma'_{zz}$) and three shear stresses ($\sigma_{r\theta}$, $\sigma_{\theta z}$, $\sigma_{rz}$) are determined based on the average compressibility value. Among which, $\sigma'_{rr}$, $\sigma'_{\theta\theta}$, $\sigma'_{zz}$ are the effective radial, tangential, and axial stresses around the wellbore, respectively, and $\sigma_{r\theta}$, $\sigma_{\theta z}$, $\sigma_{rz}$ are the shear stresses in the planes of r–θ, θ–z, and r–z, respectively. The calculated stresses are combined with a shear failure criterion and tensile strength to determine the mud weight window.

The Drucker-Prager criterion is applied to analyze wellbore collapse and shear failure. The failure envelope for the Drucker-Prager criterion is expressed as:

$$\sqrt{J_2} = 3A_0 S_p + D_0 \qquad (9).$$

where $A_0$ and $D_0$ are material strength parameters, and $\overline{J_2}$ is the mean shear stress defined by:

$$J_2 = \frac{1}{6}[(\sigma_1-\sigma_2)^2 + (\sigma_2-\sigma_3)^2 + (\sigma_3-\sigma_1)^2] \qquad (10).$$

where $S_p$ is the mean effective stress defined by:

$$S_p = \frac{\sigma_1 + \sigma_2 + \sigma_3}{3} - p. \qquad (11)$$

Figure 1A:
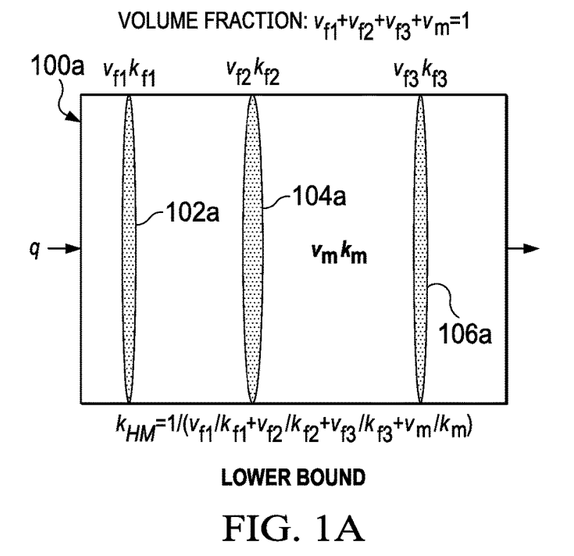
FIG. 1A represents an example set of graphs illustrating average permeability values associated with fractured rocks calculated by different average schemes, according to some implementations of the present disclosure.
Figure 1B:
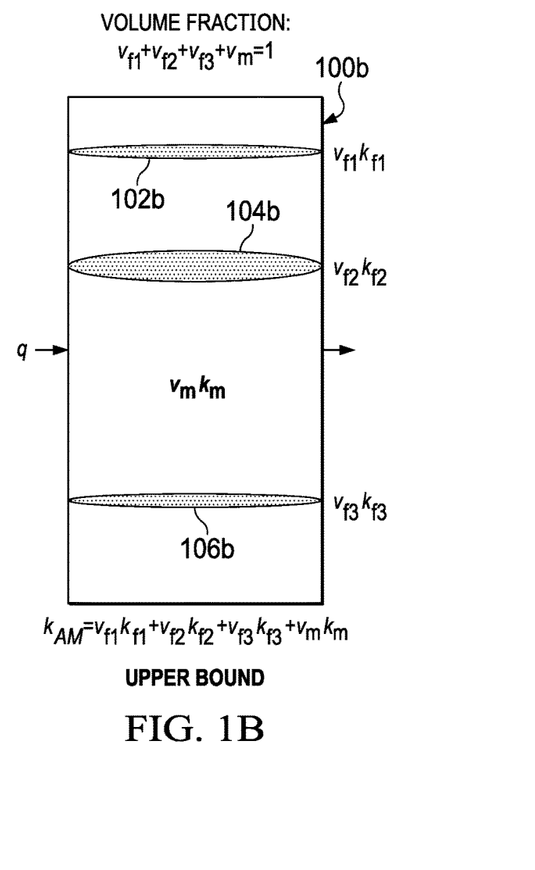
FIG. 1B represents another example set of graphs illustrating average permeability values associated with fractured rocks calculated by different average schemes, according to some implementations of the present disclosure.
Figure 1C:
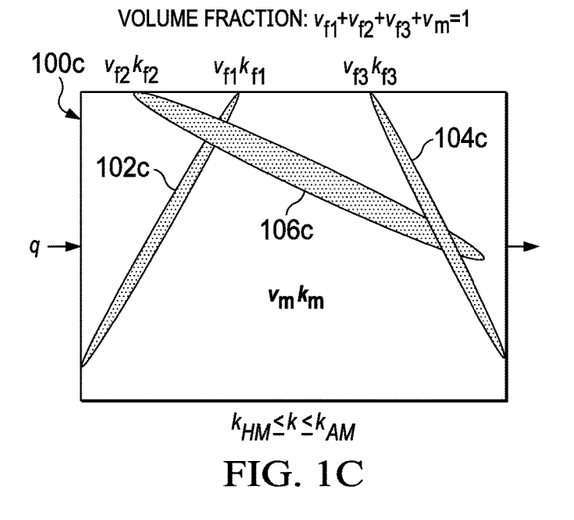
FIG. 1C represents another example set of graphs illustrating average permeability values associated with fractured rocks calculated by different average schemes, according to some implementations of the present disclosure.

Turning to the illustrated implementations. FIGS. 1A-1C represent an example set of average permeability values associated with fractured rocks (100a, 100b and 100c) calculated by different average schemes. Generally, the effective macroscopic conductivity of a heterogeneous medium depends not only on the statistical distribution of the local conductivities, but also on the geometrical and topological manner in which the local conductivity is distributed. When the correlation structure of the conductivity field is unknown, upper and lower bounds can be computed for the overall effective conductivity. The lower bound is often called the harmonic mean, whereas the upper bound is called the arithmetic mean.

FIG. 1A (the lower bound of the calculated average permeability value) illustrates an extreme case that corresponds to a series arrangement of the conductive elements 102a, 104a, and 106a, whereas FIG. 1B (the upper bound of the calculated average permeability value) illustrates another extreme case in which all of the conductive elements 102b, 104b, and 106b are arranged in parallel with each other. In both cases, the imposed pressure gradient is in the x-axis direction. Thereby, as illustrated in FIGS. 1A and 1B, in the case of harmonic average, the average permeability $k_{HM}$ is controlled by the rock matrix permeability $K_m$, and the rock fracture permeability $k_{f1}$, $k_{f2}$ and $k_{f3}$ have insignificant contribution to the average permeability. In the case of arithmetic average, the rock fracture permeability $k_{f1}$, $k_{f2}$ and $k_{f3}$ significantly contribute to the average permeability $k_{AM}$. In some instances, the average permeability k, can also be calculated by other types of average schemes (for example, as illustrated in FIG. 1C), but the results should be in the range of the average permeability value calculated by the harmonic average and arithmetic average.

Figure 2A:
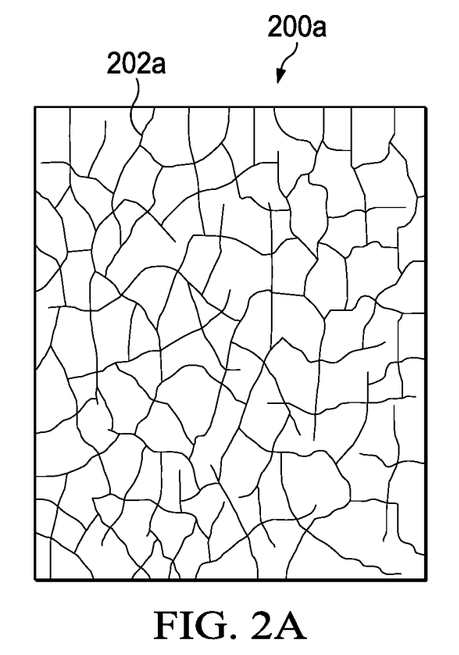
FIG. 2A represents an example set of graphs illustrating fractured rock samples with different fracture distributions and fracture sizes, according to some implementations of the present disclosure.
Figure 2B:
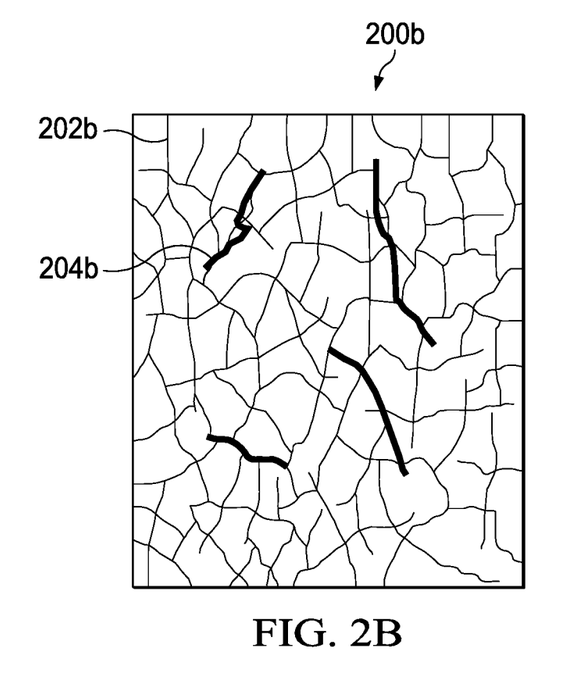
FIG. 2B represents another example set of graphs illustrating fractured rock samples with different fracture distributions and fracture sizes, according to some implementations of the present disclosure.

FIGS. 2A-2B represent an example set of graphs illustrating fractured rock samples 200a and 200b with different fracture distributions and fracture sizes. The fractures of the fractured rock sample 200a illustrated in FIG. 2A are almost evenly distributed with fractures (represented by fracture 202a) having similar size, while the fractures of the fractured rock sample 200b illustrated in FIG. 2B are more or less evenly distributed fractures (represented by fracture 202b) with some fractures (represented by fracture 204b) having a significantly larger size comparing to fracture 202b. Based on the previous discussions, it is reasonable to have an arithmetic average and a harmonic average to calculate the average properties for the rock samples shown in FIG. 2A and FIG. 2B, respectively.

FIGS. 3A-3B represent an example set of graphs illustrating the results to a numerical example which is studied to investigate the effect of rock average compressibility on the evolution of wellbore effective stress fields and mud weight window during drilling through a naturally fractured rock formation. In this implementation, effective tangential stress is used as an example to show the effect of different average schemes on the wellbore effective stress fields. Initially, the dual-porosity rock formation is under in-situ stresses and pore pressures are assumed to be in balance. Once the drilling started, the wellbore is filled with a drilling fluid and there is a constant-thickness mudcake buildup on the wellbore wall, causing additional stresses around the wellbore. These coupled effects lead to time-dependent poromechanical responses such as redistribution of stresses and pore pressures in and around the wellbore, thus affecting the overall wellbore stability.

The properties of the naturally fractured rock used in this example are displayed in Table 2. Based on the parameters listed in Table 2, the average compressibility of the naturally fractured rock can be calculated using the three listed average schemes. The results and corresponding equations used to calculate the results are presented in Table 3, accordingly.

TABLE 2

Rock and Fluid Properties

| Property | Matrix | Fracture |
|---|---|---|
| Compressibility, C (1/Megapascal Pressure (MPa)) | $2.2 \times 10^{-4}$ | $4.4 \times 10^{-2}$ |
| Poisson's Ratio, ν | 0.3 | 0.3 |
| Biot's Coefficient, α | 0.96 | 1.0 |
| Skempton's Coefficient, B | 0.7 | 0.99 |
| Permeability, k (millidarcy (mD)) | $10^{-4}$ | $10^{-2}$ |
| Volume Fraction, v (%) | 95 | 5 |
| Fluid viscosity, μ (pascal-second (Pa · s)) | 0.001 | |
| Inter-Porosity Flow Coefficient, λ (1/MPa/D) | $7.64 \times 10^{-3}$ | |

TABLE 3

Average Compressibility of the Naturally Fractured Rock

| Average Schemes | Matrix | Formula |
|---|---|---|
| Harmonic Mean | $2.30 \times 10^{-4}$ | $\left(\frac{V_{matrix}}{C_{matrix}} + \frac{V_{fracture}}{C_{fracture}}\right)^{-1}$ |
| Geometric Mean | $2.74 \times 10^{-4}$ | $(C_{matrix})^{v_{matrix}} (C_{fracture})^{v_{fracture}}$ |
| Arithmetic Mean | $2.39 \times 10^{-3}$ | $V_{matrix} C_{matrix} + V_{fracture} C_{fracture}$ |

The in-situ stresses, the pore pressure, and the wellbore information of the wellbore used in this example, are presented in Table 4. As shown in Table 4, an inclined wellbore with a radius R=0.1 m is drilled in the dual-porosity dual-permeability rock formation, with the direction of azimuth $\varphi_x=30°$ and inclination $\varphi_z=60°$. The in-situ stresses and virgin pore pressures are $S_x=25.0$ MPa, $S_y=20.0$ MPa, $S_z=29.0$ MPa, $P_0=10.0$ MPa, respectively. The wellbore mud density is selected as $\rho_m=1360$ kilogram per cubic meter (kg/m³).

TABLE 4

In-Situ Stresses and Pore Pressure, and Wellbore Information

| Parameters | Values |
|---|---|
| True Vertical Depth, TVD (meter (m)) | 900 |
| Vertical Stress Gradient, dSv (kilopascal per meter (kPa/m)) | 29 |
| Maximum Horizontal Stress Gradient, $dS_H$ (kPa/m) | 25 |
| Minimum Horizontal Stress Gradient, $dS_h$ (kPa/m) | 20 |
| Pore Pressure Gradient, dp (kPa/m) | 10 |
| Wellbore Radius, R (m) | 0.1 |
| Hole Azimuth (degree (deg)) | 30 |
| Hole Inclination (deg) | 60 |
| Maximum Horizontal Stress Azimuth (deg) | 0 |
| Mud Weight, $\rho_m$ (kg/m³) | 1360 |

FIGS. 3A-3B represent an example set of charts 300a and 300b illustrating the effective tangential stress values on the wellbore wall calculated in the direction of the minimal principal in-plane stress ($S_{min}$) and the maximum principal in-plane stress ($S_{max}$). Drilling process alters the states of in-situ principal stresses of the formation, that is, vertical stress ($S_v$), and the maximum and minimum horizontal stresses ($S_{max}$ and $S_{min}$) around the field of the wellbore. Drilling-induced stresses are introduced around the wellbore-wall whose magnitudes will revert to the in-situ stresses as moving away from the wellbore wall. In some implementations, for example, for a wellbore drilled in an elastic homogeneous rock in which one principal stress (the overburden stress, $S_v$) is parallel to the wellbore axis, at the wellbore wall (that is, when r=R), the tangential stress of a cylindrical wellbore can be defined as:

$$\sigma_{\theta\theta} = (S_{max} + S_{min}) - 2(S_{max} - S_{min})\cos 2\theta - p_w \quad (12).$$

where $p_w$ is the internal wellbore pressure. According to Equation (12), the tangential stresses are functions of the pressure $p_w$. Therefore, any change in the mud pressure will influence the tangential stress $\sigma_{\theta\theta}$. In addition, Equation (12) shows that the tangential stress reaches a maximum value at $\theta=\pm(90°)$ and a minimum value at $\theta=0$ or 170°.

Following the previously mentioned constitute equation as Equation (1), the Biot's effective stress field for the dual-porosity dual-permeability poroelasticity is defined by:

$$\sigma_{ij}' = \sigma_{ij} - (\alpha^I p^I + \alpha^{II} p^{II})\delta_{ij} \quad (13).$$

where $\sigma_{ij}'$ is the effective stress. Three types of effective stresses can be calculated by Equation (13): effective tangential stress ($\sigma'_{\theta\theta}$), effective axial stress ($\sigma'_{rr}$), and effective radial stress ($\sigma'_{zz}$). As illustrated by equations (1), (7), and (13), the value of the effective stress is dependent on the average compressibility and is time-dependent.

In this example, the effect of mudcake on the evolution of the effective tangential stress at the wellbore wall in the direction of the minimal principal in-plane stress and in the direction of the maximum principal in-plane stress are illustrated in FIGS. 3A-3B, respectively. From the beginning when no mudcake is present (when T=1 second (s)) to the time when a constant thick mudcake forms (after T=$10^5$ s), for example, when the thickness of the mudcake reaches to about 3 mm, greater effective tangential stress is observed along the $S_{min}$ direction than the $S_{max}$ direction. In FIG. 3A, line 302a represents the result of the effective tangential stress in the direction of $S_{min}$ for the case of harmonic mean, line 304a represents the result of the effective tangential stress in the direction of $S_{min}$ for the case of geometric mean, and line 306a represents the result of the effective tangential stress in the direction of $S_{min}$ for the case of arithmetic mean. As illustrated in FIG. 3A, at the same time moment (and before the constant thick mudcake forms), the result shows by line 302a is always greater than line 306a, where the result shown by line 304a is in between. Therefore, it is concluded that the effective tangential stress in the direction of $S_{min}$ is the largest for the case of harmonic mean and the smallest for the case of arithmetic mean.

In contrast, in FIG. 3B, line 302b represents the result of the effective tangential stress in the direction of $S_{max}$ for the case of harmonic mean, line 304b represents the result of the effective tangential stress in the direction of $S_{max}$ for the case of geometric mean, and line 306b represents the result of the effective tangential stress in the direction of $S_{max}$ for the case of mean arithmetic mean. As shown by FIG. 3B, at the same time moment, the result shows by line 306b is greater than line 302b, where the result shown by line 304b is in between. Therefore, it is concluded that the effective tangential stress in the direction of $S_{max}$ is the lowest for the case of harmonic mean and the largest for the case of arithmetic mean.

Figure 4:
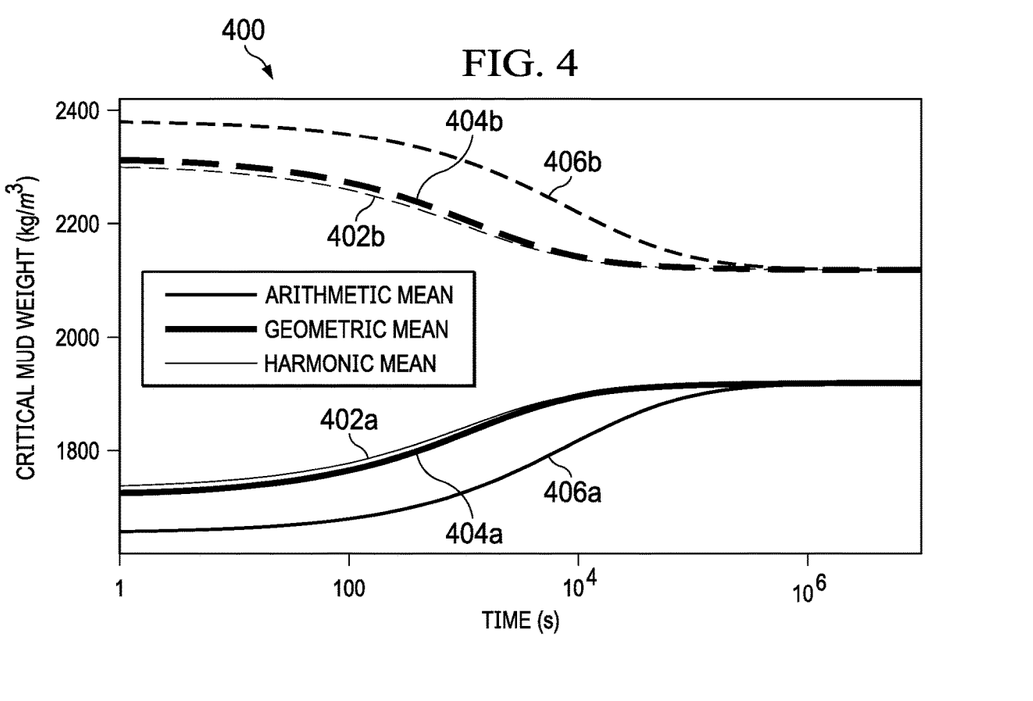
FIG. 4 represents an example chart illustrating the different prediction results of the mud weight window among the three average schemes, according to some implementations of the present disclosure.

FIG. 4 represents an example chart 400 illustrating the different prediction results of the mud weight window among the three average schemes. FIG. 4 demonstrates significant difference among the mud weight window corresponding to different average schemes.

Generally, wellbore collapse is caused by excessive effective compressive stress concentration at or near the borehole wall where the drilling mud lacks the density and chemistry balance that can prevent rock failure. Meanwhile, fracturing is created by excessive effective tensile stress concentration due to high mud density and chemical osmotic influx. A greater mud density can generate a tensile hoop stress that is closer to the minimum horizontal stress. Reduction of mud pressure, corresponding to lower confining pressure, increases the potential for shear failure. On the other hand, increasing the mud pressure above a certain limit causes the tensile failure to happen. A stable window for the mud weight exists to drill the wellbore for a stable condition. The lower limit for this window corresponds to the shear failure (breakouts) pressure, while the upper limit corresponds to the fracture initiation pressure. Therefore, two types of failures are usually considered when analyzing a wellbore failure: the tensile failure and the shear failure. The shear failure, known as breakout, can, in some implementations, happen at the point of maximum tangential stress where the rock is under maximum compression. The tensile failure known as hydraulic or induced fracture, however, is expected to occur at the point where minimum tangential stress is applied to the rock, 90° away from the location of shear failure around the wellbore.

As previously discussed and also illustrated in FIGS. 3A-3B, because the effective tangential stress in the direction of $S_{max}$ is the lowest for the case of harmonic mean, and the point on the wellbore wall in the direction of $S_{max}$ has greater potential of fracturing than other points, among the three average schemes, the harmonic mean should be used to predict the lowest fracturing mud weight. Likewise, because the effective tangential stress in the direction of $S_{min}$ is the largest for the case of the harmonic mean, and the point on the wellbore wall in the direction of $S_{min}$ has greater potential of collapse than other points, among the three average schemes, the harmonic mean should be used to predict the highest collapse mud weight.

The failure potential manifested by the above redistributed effective stress field is illustrated in terms of the mud weight windows which are the safe ranges of drilling mud density to avoid both formation collapse and fracturing, as shown in FIG. 4. In some implementations, for example, a rock failure criterion can be applied to analyze wellbore collapse and shear failure. In the example illustrated in the present disclosure, the Drucker-Prager failure criterion is used for such analysis, with compressive strength parameters as follows: $D^0=10$ MPa, $A_0=0.15$.

As shown in FIG. 4, three different mud weight windows are presented. The narrowest mud weight window ranges from less than 1000 kg/m³ to around 2200 kg/m³, while the broadest mud weight window ranges from less than 450 kg/m³ to around 2350 kg/m³. As illustrated in FIG. 4, the narrowest mud weight window (between line 402a and 402b), which has the highest lower limit and the lowest upper limit, corresponds to the harmonic mean. The broadest mud weight window (between line 406a and 406b), which has the lowest lower limit and the highest upper limit, corresponds to the arithmetic mean. Therefore, in this example, among the mud weight window calculated by the three average schemes, the mud weight window calculated by the harmonic mean should be used to adjust the mud weight.

Figure 5:
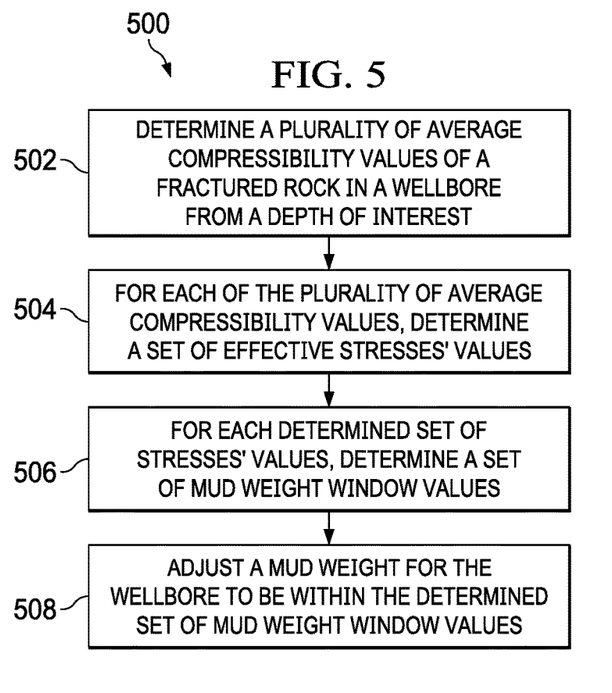
FIG. 5 represents an example flowchart for determining a safe drilling mud weight using the proposed dual-porosity dual-permeability poroelastic model, according to some implementations of the present disclosure.

FIG. 5 represents an example flowchart 500 for determining a safe drilling mud weight using the proposed dual-porosity dual-permeability poroelastic model. The model used in the method 500 in the present disclosure also takes into account the geomechanical and petrophysical properties of naturally fractured rock samples. For clarity of presentation, the description that follows generally describes method 500 in the context of the numerical example as illustrated in FIGS. 3A-4. However, it will be understood that method 500 can be performed, for example, by any system, environment, software, or a combination of systems, environments, software, and hardware, as appropriate. In some implementations, various steps of method 500 can be run in parallel, in combination, in loops, or in any order.

At 502, a number of average compressibility values of a fractured rock in a wellbore from a depth of interest is determined, where each of the number of average compressibility values is determined according to a different average scheme.

As previously discussed, and according to Equation (1), the average compressibility of a naturally fractured rock formation plays an important role in the stress-strain relations. In some implementations, however, properties other than the average compressibility may also be calculated in this step. Further, because the average compressibility of the naturally fractured rock are determined based on the fractures' size, density, and distribution, in some implementations, at least three average schemes have been implemented, that is, harmonic mean, geometric mean, and arithmetic mean, to determine the average compressibility. The values of the determined average compressibility according to different average schemes is dependent on the fractures' geometrical characteristics, as discussed in conjunction with FIGS. 1A-1C and 2A-2B. From 502, method 500 proceeds to 504.

At 504, for each of the number of determined average compressibility values, a set of effective stresses' values is determined based on that average compressibility value. In some implementations, determining a set of stresses values includes determining values of the effective tangential stress ($\sigma'_{rr}$), the effective axial stress ($\sigma'_{\theta\theta}$), the effective radial stress ($\sigma'_{zz}$) and the three shear stresses ($\sigma_{r\theta}$, $\sigma_{\theta z}$, $\sigma_{rz}$, respectively). The values of the three effective stresses and the three shear stresses can be obtained by known methods in existing technology.

In some implementations, determining the set of effective stresses' values includes substituting each of the number of average compressibility value together with at least one of a wellbore trajectory, an in-situ stresses, a pore pressure, and a rock poromechanical properties to a dual-porosity poroelastic analytic solution.

Because the equations and the calculations to determine the stress concentration around a wellbore inclined to the principal stress axes are complicated, they are usually solved using a computer application designed for the purpose. In some implementations for example, a stability analyzer can be used to determine such values. From 504, method 500 proceeds to 505.

At 506, for each determined set of stresses values, a set of mud weight window values is determined based on the determined set of stresses values. In some implementations, the determined stresses values are combined with a shear failure criterion and tensile strength to determine the mud weight window. In some implementations, for example, the Drucker-Prager failure criterion can be applied in this step.

In some implementations, after multiple sets of mud weight window values are determined, the set of mud weight window values with the smallest range of values is selected. In some implementations, for example, the mud weight window with the highest lower limit and the lowest upper limit, corresponding to the highest collapse mud weight and the lowest fracturing mud weight, can be selected as the safe drilling mud weight window. In some implementations, for example, the lower limit and the upper limit of the mud weight window also correspond to the lowest effective tangential stress and the largest effective tangential stress, respectively, where each of the lowest and the largest effective tangential stresses can be calculated by one of the average schemes as provided. From 505, method 500 proceeds to 508.

At 508, the mud weight for the wellbore is adjusted to be within the selected mud weight window value. At this step, in some implementations, for example, the mud weight can be adjusted according to the selected mud weight window to ensure the wellbore stability and safe drilling. After 508, method 500 stops.

Figure 6:
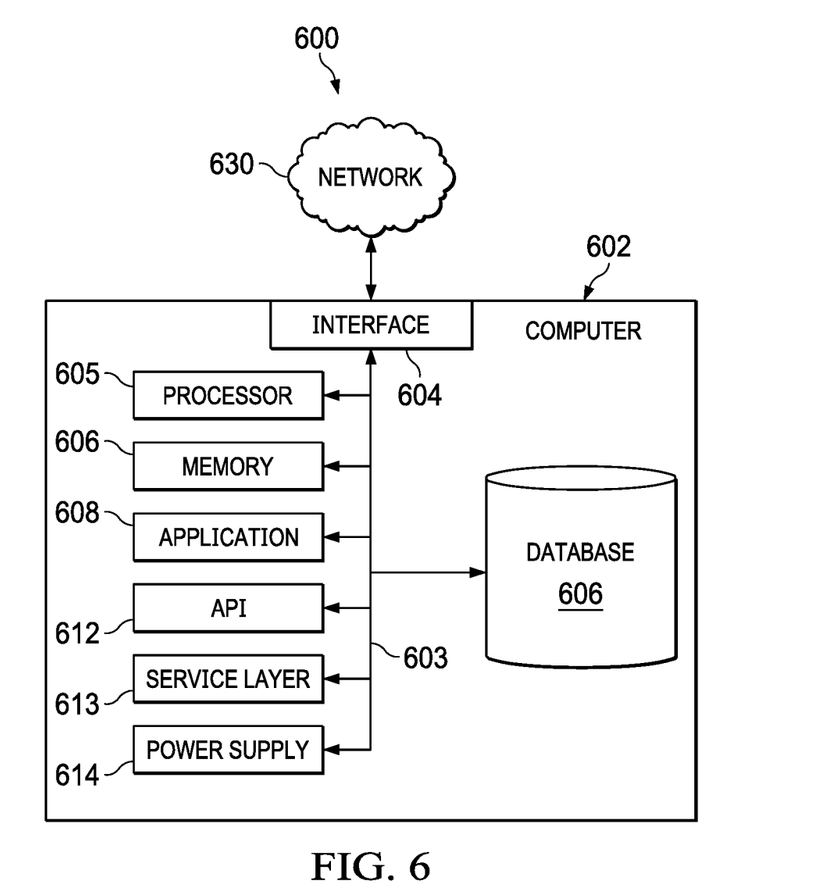
FIG. 6 is a block diagram illustrating an example of a computer-implemented system used to provide computational functionalities associated with described algorithms, methods, functions, processes, flows, and procedures, according to some implementations of the present disclosure Like reference numbers and designations in the various drawings indicate like elements.

FIG. 6 is a block diagram illustrating an example of a computer-implemented system used to provide computational functionalities associated with described algorithms, methods, functions, processes, flows, and procedures, according to some implementations of the present disclosure. In the illustrated implementation, System 600 includes a Computer 602 and a Network 630.

The illustrated Computer 602 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 602 can include an input device, such as a keypad, keyboard, touch screen, another input device, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as a client, network component, a server, a database or another persistency, another role, or a combination of roles for performing the subject matter described in the present disclosure. The illustrated Computer 602 is communicably coupled with a Network 630. In some implementations, one or more components of the Computer 602 can be configured to operate within an environment, including cloud-computing-based, local, global, another environment, or a combination of environments.

At a high level, the Computer 602 is an electronic computing device operable to receive, transmit, process, store, or manage data and information associated with the described subject matter. According to some implementations, the Computer 602 can also include or be communicably coupled with a server, including an application server, e-mail server, web server, caching server, streaming data server, another server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory, conventional, or another type of database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602.

The Computer 602 also includes a Memory 606 that can hold data for the Computer 602, another component or components communicatively linked to the Network 630 (whether illustrated or not), or a combination of the Computer 602 and another component. Memory 606 can store any data consistent with the present disclosure. In some implementations, Memory 606 can be a combination of two or more different types of memory (for example, a combination of semiconductor and magnetic storage) according to particular needs, desires, or particular implementations of the Computer 602 and the described functionality. Although illustrated as a single Memory 606, two or more Memories 606 or similar or differing types can be used according to particular needs, desires, or particular implementations of the Computer 602 and the described functionality. While Memory 606 is illustrated as an integral component of the Computer 602, in alternative implementations, Memory 606 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 606 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, a computer-implemented method, including: determining a number of average compressibility values of a fractured rock in a wellbore from a depth of interest, where each of the number of average compressibility values is determined according to a different average scheme; for each of the number of average compressibility values, determining a set of effective stresses values based on that average compressibility value; for each determined set of stresses values, determining a set of mud weight window values based on the set of stresses values; and adjusting mud weight for the wellbore to be within the determined set of mud weight window.

The foregoing and other described implementations can each, optionally, include one or more of the following features:

A first feature, combinable with any of the following features, where the average scheme used to determine the average compressibility value can be a harmonic mean, an arithmetic mean, or a geometric mean.

A second feature, combinable with any of the previous or following features, where determining the set of effective stresses' values includes substituting to each of the number of average compressibility value together with at least one of a wellbore trajectory, an in-situ stresses, a pore pressure, and a rock poromechanical properties to a dual-porosity poroelastic analytic solution.

A third feature, combinable with any of the previous or following features, where determining a set of stresses values includes determining values of an effective tangential stress, an effective axial stress, an effective radial stress, and three different shear stresses.

A fourth feature, combinable with any of the previous or following features, including determining a set of stress values based on a dual-porosity dual-permeability poroelastic model.

A fifth feature, combinable with any of the previous or following features, determining a set of mud weight window values further includes selecting the set of mud weight window values with the smallest range of values.

A sixth feature, combinable with any of the previous or following features, where the determined average compressibility value according to different average schemes is associated with fractures' geometrical characteristics.

A seventh feature, combinable with any of the previous or following features, where determining the mud weight window value based on the effective stress value includes applying a at least one rock failure criteria to analyze wellbore stability.

In a second implementation, a non-transitory, computer-readable medium storing one or more instructions executable by a computer system to perform operations including: determining a number of average compressibility values of a fractured rock in a wellbore from a depth of interest, where each of the number of average compressibility values is determined according to a different average scheme; for each of the number of average compressibility values, determining a set of effective stresses' values based on that average compressibility value; for each determined set of stresses values, determining a set of mud weight window values based on the set of stresses values; and adjusting mud weight for the wellbore to be within the determined set of mud weight window.

The foregoing and other described implementations can each, optionally, include one or more of the following features:

A first feature, combinable with any of the following features, where the average scheme used to determine the average compressibility value can be a harmonic mean, an arithmetic mean, or a geometric mean.

A second feature, combinable with any of the previous or following features, where determining the set of effective stresses' values includes substituting each of the number of average compressibility value together with at least one of a wellbore trajectory, an in-situ stresses, a pore pressure, and a rock poromechanical properties to a dual-porosity poroelastic analytic solution.

A third feature, combinable with any of the previous or following features, where determining a set of stresses values includes determining values of an effective tangential stress, an effective axial stress, an effective radial stress, and three different shear stresses.

A fourth feature, combinable with any of the previous or following features, including determining a set of stress values based on a dual-porosity dual-permeability poroelastic model.

A fifth feature, combinable with any of the previous or following features, where determining a set of mud weight window values further includes selecting the set of mud weight window values with the smallest range of values.

A sixth feature, combinable with any of the previous or following features, where the determined average compressibility value according to different average schemes is associated with fractures' geometrical characteristics.

A seventh feature, combinable with any of the previous or following features, where determining the mud weight window value based on the effective stress value includes applying a at least one rock failure criteria to analyze wellbore stability.

In a third implementation, a computer-implemented system, including: one or more computers; and one or more computer memory devices interoperably coupled with the one or more computers and having tangible, non-transitory, machine-readable media storing one or more instructions that, when executed by the one or more computers, perform one or more operations including: determining a number of average compressibility values of a fractured rock in a wellbore from a depth of interest, where each of the number of average compressibility values is determined according to a different average scheme; for each of the number of average compressibility values, determining a set of effective stresses' values based on that average compressibility value; for each determined set of stresses values, determining a set of mud weight window values based on the set of stresses values; and adjusting mud weight for the wellbore to be within the determined set of mud weight window.

The foregoing and other described implementations can each, optionally, include one or more of the following features:

A first feature, combinable with any of the following features, where the average scheme used to determine the average compressibility value can be a harmonic mean, an arithmetic mean, or a geometric mean.

A second feature, combinable with any of the previous or following features, where determining the set of effective stresses' values includes substituting each of the number of average compressibility value together with at least one of a wellbore trajectory, an in-situ stresses, a pore pressure, and a rock poromechanical properties to a dual-porosity poroelastic analytic solution.

A third feature, combinable with any of the previous or following features, where determining a set of stresses values includes determining values of an effective tangential stress, an effective axial stress, an effective radial stress, and three different shear stresses.

A fourth feature, combinable with any of the previous or following features, including determining a set of stress values based on a dual-porosity dual-permeability poroelastic model.

A fifth feature, combinable with any of the previous or following features, where determining a set of mud weight window values further includes selecting the set of mud weight window values with the smallest range of values.

A sixth feature, combinable with any of the previous or following features, where the determined average compressibility value according to different average schemes is associated with fractures' geometrical characteristics.

A seventh feature, combinable with any of the previous or following features, where determining the mud weight window value based on the effective stress value includes applying a at least one rock failure criteria to analyze wellbore stability.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example, LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device. Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with some implementations of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 702.11 a/b/g/n or 702.20 (or a combination of 702.11x and 702.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any described subject matter or on the scope of what can be claimed, but rather as descriptions of features that can be specific to particular implementations of particular subject matters. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   determining a plurality of average compressibility values of a fractured rock in a wellbore from a depth of interest, wherein each of the plurality of average compressibility values is determined according to a different average scheme;
   for each of the plurality of average compressibility values, determining a set of effective stresses values based on a respective average compressibility value;
   for each determined set of effective stresses values, determining a set of mud weight window values based on the set of effective stresses values; and
   adjusting mud weight for the wellbore to be within a respective mud weight window value of the set of mud weight window values.

2. The computer-implemented method of claim 1, wherein the different average scheme used to determine one of the plurality of average compressibility values is a harmonic mean, an arithmetic mean, or a geometric mean.

3. The computer-implemented method of claim 1, wherein determining the set of effective stresses values comprises substituting the respective average compressibility value together with at least one of a wellbore trajectory, an in-situ stresses, a pore pressure, and a rock poromechanical properties to a dual-porosity poroelastic analytic solution.

4. The computer-implemented method of claim 1, wherein determining a set of stresses values comprises determining values of an effective tangential stress, an effective axial stress, an effective radial stress, and three different shear stresses.

5. The computer-implemented method of claim 1, comprising determining a set of stress values based on a dual-porosity dual-permeability poroelastic model.

6. The computer-implemented method of claim 1, wherein determining the set of mud weight window values further comprises selecting a set of mud weight window values with a smallest range of values.

7. The computer-implemented method of claim 1, wherein the determined plurality of average compressibility values according to different average schemes is associated with fractures' geometrical characteristics.

8. The computer-implemented method of claim 1, wherein determining the set of mud weight window values based on the set of effective stresses values comprises applying at least one rock failure criteria to analyze wellbore stability.

9. A non-transitory, computer-readable medium storing one or more instructions executable by a computer system to perform operations comprising:
   determining a plurality of average compressibility values of a fractured rock in a wellbore from a depth of interest, wherein each of the plurality of average compressibility values is determined according to a different average scheme;
   for each of the plurality of average compressibility values, determining a set of effective stresses values based on a respective average compressibility value;
   for each determined set of effective stresses values, determining a set of mud weight window values based on the set of effective stresses values; and adjusting mud weight for the wellbore to be within a respective mud weight window value of the set of mud weight window values.

10. The non-transitory, computer-readable medium of claim 9, wherein the different average scheme used to determine one of the plurality of average compressibility values is a harmonic mean, an arithmetic mean, or a geometric mean.

11. The non-transitory, computer-readable medium of claim 9, wherein determining the set of effective stresses values comprises substituting the respective average compressibility value together with at least one of a wellbore trajectory, an in-situ stresses, a pore pressure, and a rock poromechanical properties to a dual-porosity poroelastic analytic solution.

12. The non-transitory, computer-readable medium of claim 9, wherein determining a set of stresses values comprises determining values of an effective tangential stress, an effective axial stress, an effective radial stress, and three different shear stresses.

13. The non-transitory, computer-readable medium of claim 9, comprising determining a set of stress values based on a dual-porosity dual-permeability poroelastic model.

14. The non-transitory, computer-readable medium of claim 9, wherein determining the set of mud weight window values further comprises selecting a set of mud weight window values with a smallest range of values.

15. The non-transitory, computer-readable medium of claim 9, wherein the determined plurality of average compressibility values according to different average schemes is associated with fractures' geometrical characteristics.

16. The non-transitory, computer-readable medium of claim 9, wherein determining the set of mud weight window values based on the set of effective stresses values comprises applying a at least one rock failure criteria to analyze wellbore stability.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

determining a plurality of average compressibility values of a fractured rock in a wellbore from a depth of interest, wherein each of the plurality of average compressibility values is determined according to a different average scheme;

for each of the plurality of average compressibility values, determining a set of effective stresses values based on a respective average compressibility value;

for each determined set of effective stresses values, determining a set of mud weight window values based on the set of effective stresses values; and adjusting mud weight for the wellbore to be within a respective mud weight window value of the set of mud weight window values.

18. The computer-implemented system of claim 17, wherein the different average scheme used to determine one of the plurality of average compressibility values is a harmonic mean, an arithmetic mean, or a geometric mean, and wherein the average scheme is associated with fractures' geometrical characteristics.

19. The computer-implemented system of claim 17, wherein determining the set of effective stresses values comprises substituting the respective average compressibility value together with at least one of a wellbore trajectory, an in-situ stresses, a pore pressure, and a rock poromechanical properties to a dual-porosity poroelastic analytic solution.

20. The computer-implemented system of claim 17, wherein determining a set of stresses values comprises determining values of an effective tangential stress, an effective axial stress, an effective radial stress, and three different shear stresses; and wherein the set of stresses values are determined based on a dual-porosity dual-permeability poroelastic model.

* * * * *